United States Patent

Arabia, Jr. et al.

(10) Patent No.: US 9,279,276 B2
(45) Date of Patent: Mar. 8, 2016

(54) CHARGE CORD LOCKING/UNLOCKING ACTUATOR

(71) Applicant: GM GLOBAL TECHNOLOGY OPERATIONS LLC, Detroit, MI (US)

(72) Inventors: Frank J. Arabia, Jr., Macomb, MI (US); Jeffrey L. Konchan, Romeo, MI (US); Scott A. Sorbie, Clinton Township, MI (US); Michelle Zirngibl Taylor, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 234 days.

(21) Appl. No.: 13/961,595

(22) Filed: Aug. 7, 2013

(65) Prior Publication Data

US 2014/0042964 A1 Feb. 13, 2014

Related U.S. Application Data

(60) Provisional application No. 61/681,737, filed on Aug. 10, 2012.

(51) Int. Cl.
| | |
|---|---|
| *H02J 7/00* | (2006.01) |
| *H01R 13/44* | (2006.01) |
| *H01R 13/62* | (2006.01) |
| *H01R 13/625* | (2006.01) |

(Continued)

(52) U.S. Cl.
CPC .............. *E05B 83/00* (2013.01); *B60L 11/1818* (2013.01); *B60L 2270/32* (2013.01); *B60L 2270/34* (2013.01); *Y02T 10/7005* (2013.01); *Y02T 90/14* (2013.01); *Y10T 70/5889* (2013.01)

(58) Field of Classification Search
CPC . Y02T 90/14; B60L 11/1818; B60L 2270/34; E05B 83/00; B65F 2003/0243; B62D 1/184; F16H 63/18
USPC ................... 320/107, 109; 439/133, 304, 347
See application file for complete search history.

(56) References Cited

U.S. PATENT DOCUMENTS 5,413,493 A * 5/1995 Hoffman ........................ 439/188
5,627,448 A * 5/1997 Okada et al. ................... 439/133

(Continued)

FOREIGN PATENT DOCUMENTS

| JP | 2011243498 A | 12/2011 |
|---|---|---|
| JP | 2011243500 A * | 12/2011 |

OTHER PUBLICATIONS

Chinese Office Action for Application No. 201310552742.0 dated Jun. 25, 2015 (8 pgs).

*Primary Examiner* — Helen Rossoshek
(74) *Attorney, Agent, or Firm* — Cantor Colburn LLP

(57) ABSTRACT

A locking mechanism secures a plug of a charging cord in a charging receptacle of a vehicle and includes an actuator, a linear-actuated cam connected thereto and driven along a linear travel path thereby (the cam defining a slot therein positioned at an angle relative to the path), and a locking arm pivotally mounted at a pivot point to a component disposed adjacent the arm. The arm includes a follower pin that engages the slot. The arm pivots about the point to move between locked and unlocked positions in response to movement of the cam along the path. A housing of the vehicle includes the receptacle, a charging interface connected with the plug to allow current to flow from a charging unit to a system of batteries of the vehicle during a charging operation, and the mechanism.

20 Claims, 7 Drawing Sheets

(51) Int. Cl.
*E05B 83/00* (2014.01)
*B60L 11/18* (2006.01)

(56) References Cited

U.S. PATENT DOCUMENTS

| | | | |
|---|---|---|---|
| 5,676,560 A | 10/1997 | Endo et al. | |
| 5,703,462 A * | 12/1997 | Woody et al. | 320/108 |
| 5,711,558 A * | 1/1998 | Woody | 292/335 |
| 5,714,864 A * | 2/1998 | Rose et al. | 320/109 |
| 5,727,847 A * | 3/1998 | Martone et al. | 297/375 |
| 6,014,597 A * | 1/2000 | Kochanneck | 701/22 |
| 6,938,507 B2 * | 9/2005 | Fisher | 74/89.16 |
| 8,098,042 B2 * | 1/2012 | Nakayama et al. | 320/107 |
| 8,172,599 B2 * | 5/2012 | Konchan | 439/352 |
| 8,442,700 B2 * | 5/2013 | Anderson | 701/2 |
| 8,482,250 B2 * | 7/2013 | Soar | 320/109 |
| 8,616,909 B2 * | 12/2013 | Kurumizawa et al. | 439/304 |
| 8,698,349 B2 * | 4/2014 | Kurumizawa et al. | 307/10.1 |
| 8,774,997 B2 * | 7/2014 | Ichikawa et al. | 701/22 |
| 8,896,266 B2 * | 11/2014 | Ohtomo | 320/109 |
| 8,951,060 B2 * | 2/2015 | Meyer-Ebeling | 439/347 |
| 2011/0281452 A1 | 11/2011 | Kurumizawa et al. | |
| 2012/0098490 A1 * | 4/2012 | Masuda | 320/109 |
| 2012/0126747 A1 * | 5/2012 | Kiko et al. | 320/109 |
| 2012/0135626 A1 | 5/2012 | Tormey et al. | |
| 2012/0217928 A1 * | 8/2012 | Kulidjian et al. | 320/109 |
| 2012/0303190 A1 * | 11/2012 | Pfeiffer | 701/22 |
| 2012/0319648 A1 * | 12/2012 | Ohtomo | 320/109 |
| 2013/0026971 A1 * | 1/2013 | Luke et al. | 320/104 |
| 2013/0241484 A1 * | 9/2013 | KIKO et al. | 320/109 |
| 2013/0255334 A1 * | 10/2013 | Kurumizawa et al. | 70/258 |
| 2013/0257373 A1 * | 10/2013 | Mallon et al. | 320/109 |
| 2014/0002018 A1 * | 1/2014 | Montemayor Cavazos et al. | 320/109 |
| 2014/0152255 A1 * | 6/2014 | Lovett et al. | 320/109 |
| 2014/0167695 A1 * | 6/2014 | Shimizu et al. | 320/109 |
| 2014/0210410 A1 * | 7/2014 | Gorenzweig et al. | 320/109 |
| 2015/0027846 A1 * | 1/2015 | Marklen | 192/219.6 |

* cited by examiner

CHARGE CORD LOCKING/UNLOCKING ACTUATOR

CROSS-REFERENCE TO RELATED APPLICATION

This application is based upon and claims benefit of the filing date of U.S. Provisional Patent Application 61/681,737 that was filed on Aug. 10, 2012 and entitled "Charge Cord Locking/Unlocking Actuator," which is hereby incorporated herein by reference in its entirety.

FIELD OF THE INVENTION

The subject invention relates to a locking mechanism for securing a plug in a charging receptacle and, in particular, for securing a plug in a charging receptacle of an electric vehicle.

BACKGROUND

Electric vehicles are powered, at least in part, by a system of rechargeable batteries. The batteries may be charged, for example, by a charging unit connected to an external power supply. The charging unit includes a base unit, a wall plug configured to connect the base unit to a power supply, and a charging cord configured to connect the base unit to the electric vehicle. One end of the charging cord is connected to the base unit, and another end of the charging cord includes a plug configured to interface with the electric vehicle.

The electric vehicle typically includes a receptacle configured to receive and interface with the plug of the charging unit. The interface between the receptacle of the vehicle and the plug may be any standard configuration that allows electric current to be transmitted from the charging unit to the vehicle and batteries.

In public charging areas, there is a risk of unauthorized use of the electric charging unit. For example, an unauthorized person may remove the plug from the receptacle of a vehicle being charged to charge their own vehicle. As a result, the original vehicle may not receive a complete charge. In addition, damage to the vehicle or plug may occur by removing the plug from the receptacle during a charging operation due to the current flowing through the interface.

To address these issues, an electric vehicle may include a locking mechanism configured to secure the plug against removal from the receptacle. These locking mechanisms include a locking pin that is linearly movable by an actuator to extend into the corresponding opening of the plug. However, such a locking pin is subject to high frictional variation that may lead to binding of the locking pin during actuation. Further, additional components, such as a return spring, may be necessary to allow for two-way motion of the locking pin.

Accordingly, it is desirable to provide a locking mechanism for retaining a charging plug in a charging receptacle of an electric vehicle that is not subject to high frictional variation that may lead to binding of the locking pin during actuation and does not need additional components (such as a return spring) to allow for two-way motion of the locking pin.

SUMMARY OF THE INVENTION

In one exemplary embodiment of the invention, there is provided a locking mechanism for securing a plug of a charging cord in a charging receptacle of a vehicle. The locking mechanism includes an actuator and a linear-actuated cam connected to the actuator, driven along a substantially linear travel path by the actuator, and defining a cam slot formed therein positioned at an angle relative to the linear travel path. A locking arm is pivotally mounted at a pivot point to a component disposed adjacent to the locking arm and includes a follower pin that engages the cam slot. The locking arm is configured to pivot about the pivot point to move between a locked position and an unlocked position in response to movement of the linear-actuated cam along the linear travel path.

In another exemplary embodiment of the invention, there is provided a housing of a vehicle including a system of batteries that receive a charge from an external power source. The housing includes a receptacle adapted to receive a charging cord from the external power source, a charging interface configured to connect with the charging cord to allow current to flow from the external power source to the system of batteries during a charging operation, and the locking mechanism arranged in the housing to secure the charging cord in the receptacle.

The above features and advantages and other features and advantages of the invention are readily apparent from the following detailed description of the invention when taken in connection with the accompanying drawings.

BRIEF DESCRIPTION OF THE DRAWINGS

Other features, advantages, and details appear, by way of example only, in the following detailed description of embodiments, the detailed description referring to the drawings in which.

DESCRIPTION OF THE EMBODIMENTS

Figure 1:
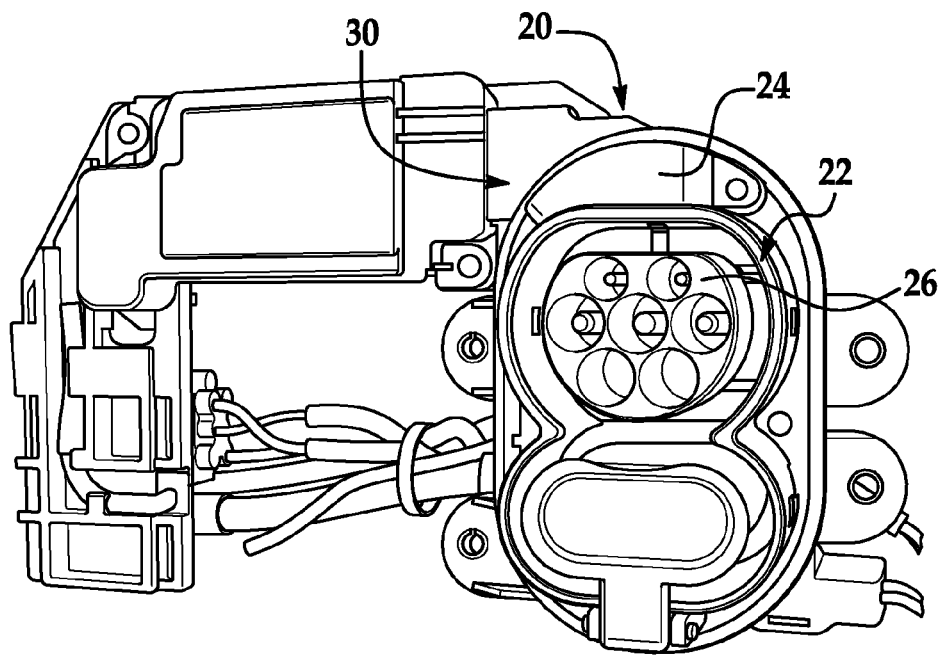
FIG. 1 is a front perspective view of a housing and a locking mechanism according to an exemplary embodiment of the subject invention.

The following description is merely exemplary in nature and is not intended to limit the present disclosure or its application or uses. It should be understood that, throughout the drawings, corresponding reference numerals indicate like or corresponding parts and features.

In accordance with an exemplary embodiment of the invention, a housing 20 is positioned in a vehicle (not shown). In an exemplary embodiment, the vehicle is an electric or hybrid-electric vehicle having a system of batteries that may receive a charge from an external power source. With reference to FIG. 1, the housing 20 includes a receptacle 22, a cover 24, and a charging interface 26. The housing 20 may be based upon SAE or IEC standards. The receptacle 22 is configured to receive a plug from a charging unit (not shown). The cover 24 is configured to cover components of a locking mechanism located within the housing 20, as described below. The charging interface 26 connects with the plug to allow a current to flow from the charging unit to batteries in the vehicle during a charging operation.

The locking mechanism is disposed within housing 20. The locking mechanism is configured to secure the plug in the receptacle 22 and includes an actuator 30 (FIG. 2), a linear-actuated cam 40 (FIG. 3), and a pivoting locking arm 50 (FIG. 3).

Figure 2:
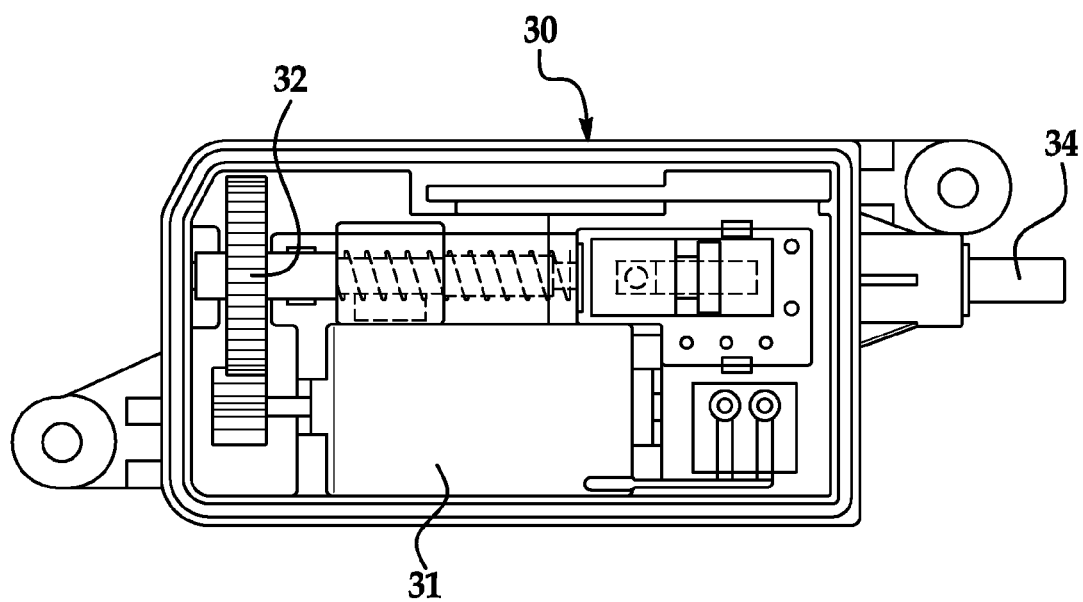
FIG. 2 is a sectional view of an actuator according to an exemplary embodiment of the subject invention.
Figure 3:
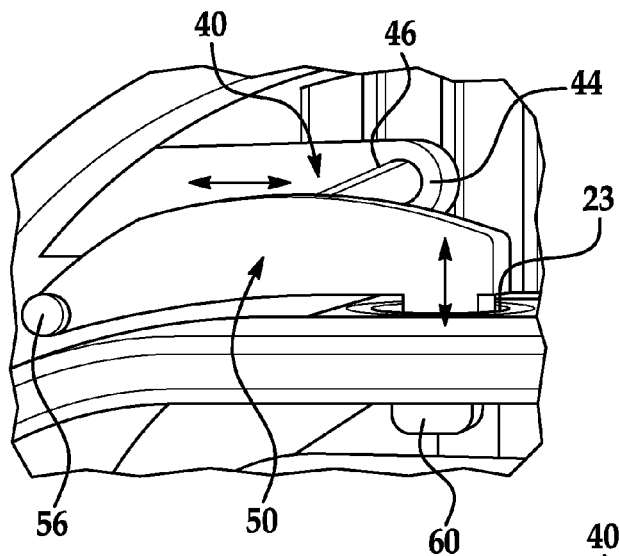
FIG. 3 is a front perspective view of a locking mechanism according to an exemplary embodiment of the subject invention.

With reference to FIG. 2, the actuator 30 may include a DC motor 31 that drives a system of gears 32 to move an actuating pin 34 along a linear travel path. The actuating pin 34 is connected to the linear-actuated cam 40 (FIG. 3) and configured to move the linear-actuated cam 40 along a linear travel path.

With reference to FIGS. 4A-5B, the linear-actuated cam 40 includes a first end 42, a second end 44, and a cam slot 46. The actuating pin 34 is connected to the first end 42 of the linear-actuated cam 40. The cam slot 46 is disposed on one face of the linear-actuated cam 40 and extends at an angle relative to the linear travel path. In an exemplary embodiment, the cam slot 46 may include different segments extending at different angles to vary the movement or output of the linear-actuated cam 40. For example, the cam slot 46 may include a first segment 47 extending at a first angle relative to the linear travel path and a second segment 48 extending at a second angle relative to the linear path, wherein the second angle is different than the first (FIG. 4B). It is understood that the cam slot 46 may include more than two segments 47, 48 to provide variable movement or output as needed. For example, the cam slot 46 may include a third segment extending at a third angle relative to the linear travel path that is different than the first and/or second angle(s). It is also understood that the shape of the cam slot 46 may be varied. For example, the cam slot 46 may be linear or curved along its length to further vary the output of the linear-actuated cam 40.

With further reference to FIGS. 4A - 5B, the locking arm 50 includes a first end 52, a second end 54, a pivot pin 56, a follower pin 58, and a lock bolt 60. The pivot pin 56 is disposed at a predetermined position along a length of the locking arm 50 suitable for a particular application of the locking mechanism. In an exemplary embodiment, the pivot pin 56 is positioned proximate to the first end 52 of the locking arm 50. It is understood that the pivot pin 56 may be disposed at other positions along the locking arm 50. The locking arm 50 and the linear-actuated cam 40 may be covered by the cover 24 (FIG. 1) within the housing 20.

The follower pin 58 extends from a side of the locking arm 50 facing the cam slot 46 of the linear-actuated cam 40. The follower pin 58 is configured to engage the cam slot 46. It is understood that the follower pin 58 may have a width substantially equal to or slightly less than a width of the cam slot 46 so that the follower pin 58 may be received therein.

The lock bolt 60 extends from an end opposite from the pivot pin 56 of the locking arm 50 and is configured to selectively project through an opening into the receptacle 22 to engage a vehicle charging plug (not shown). In an exemplary embodiment, the lock bolt 60 is positioned proximate to the second end 54 of the locking arm 50, but may be positioned elsewhere in other exemplary embodiments.

Figure 6A:
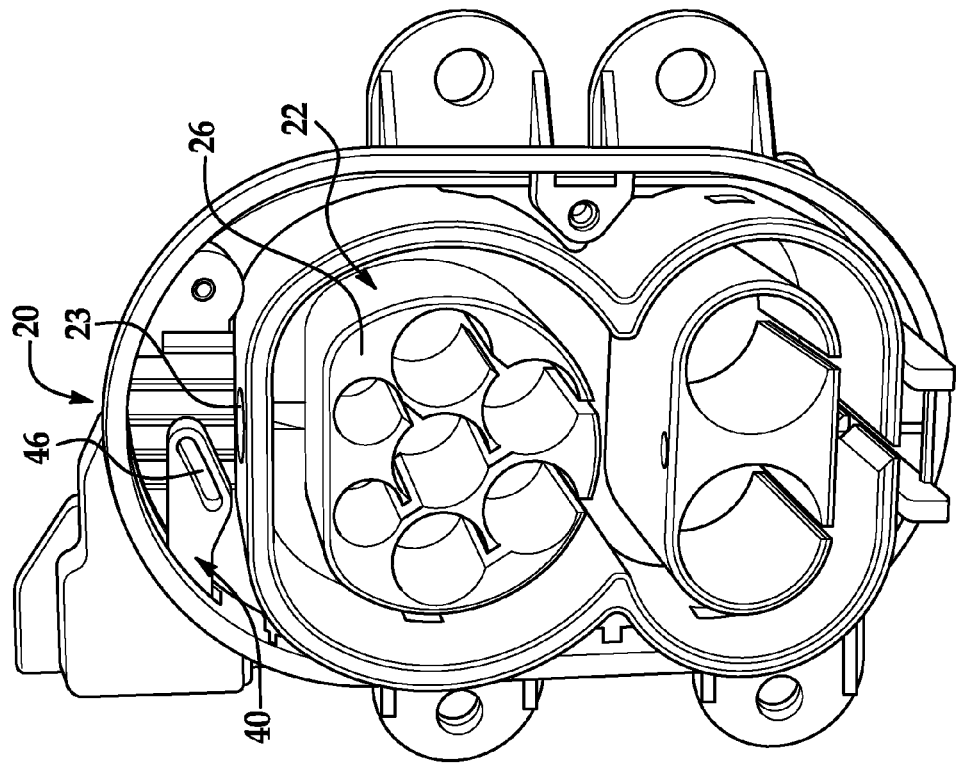
FIGS. 6A and 6B are front perspective views of a linear-actuated cam in retracted and extended positions, respectively, according to an exemplary embodiment of the subject invention.
Figure 6B:
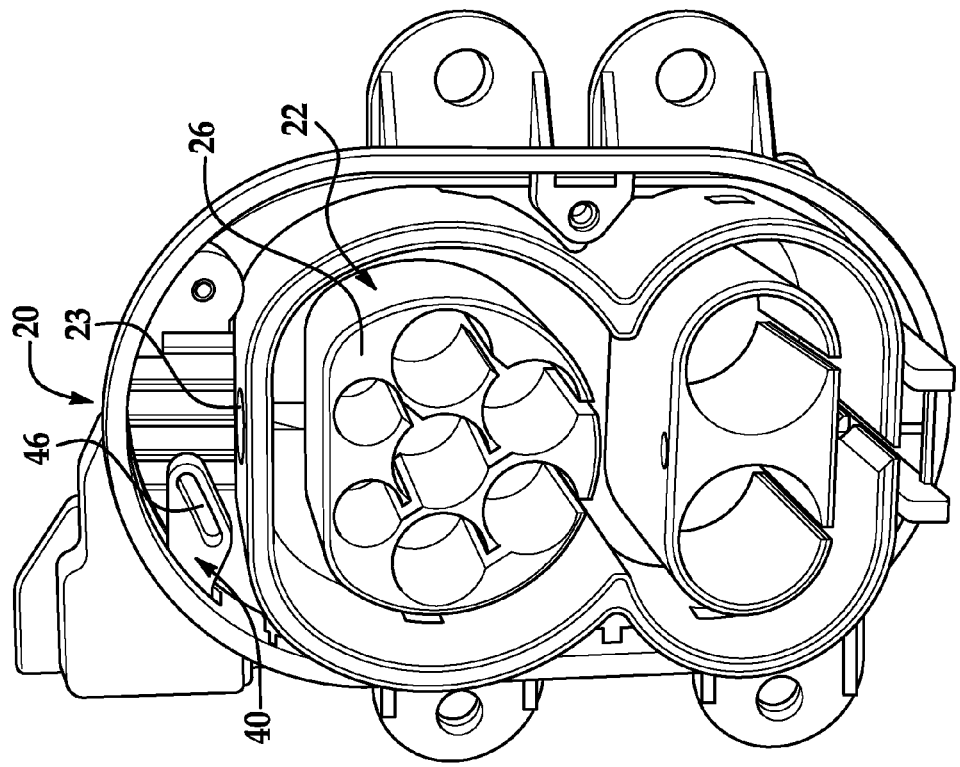
Figure 7A:
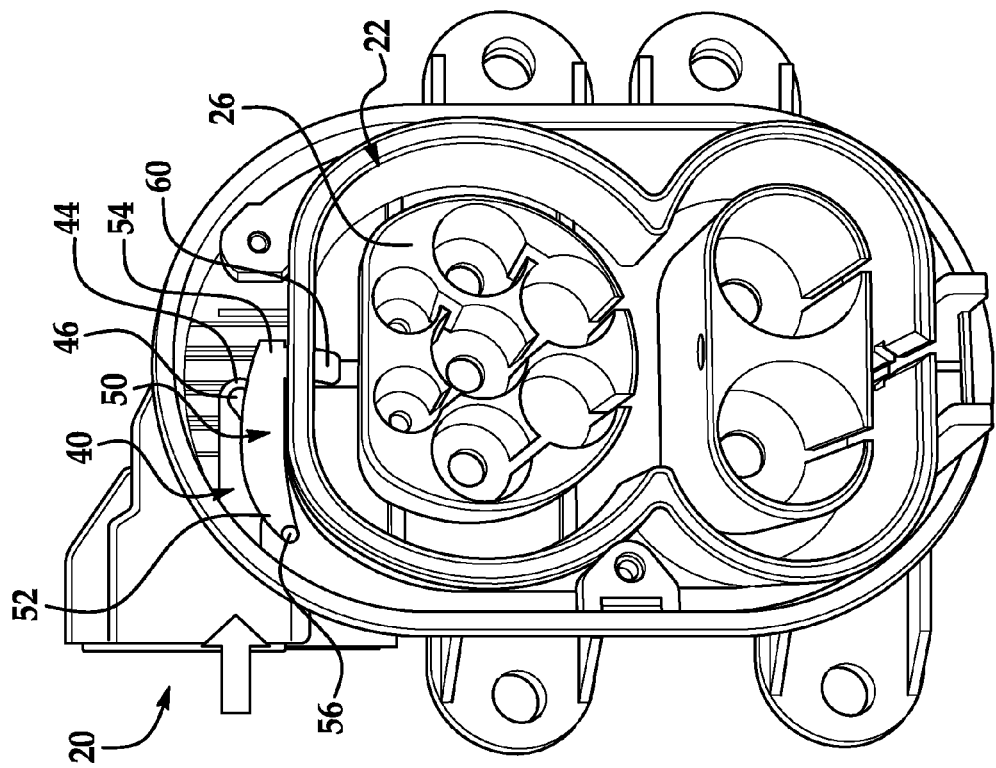
FIGS. 7A and 7B are front perspective views of a pivoting locking arm in an unlocked and a locked position, respectively, according to an exemplary embodiment of the subject invention.
Figure 7B:
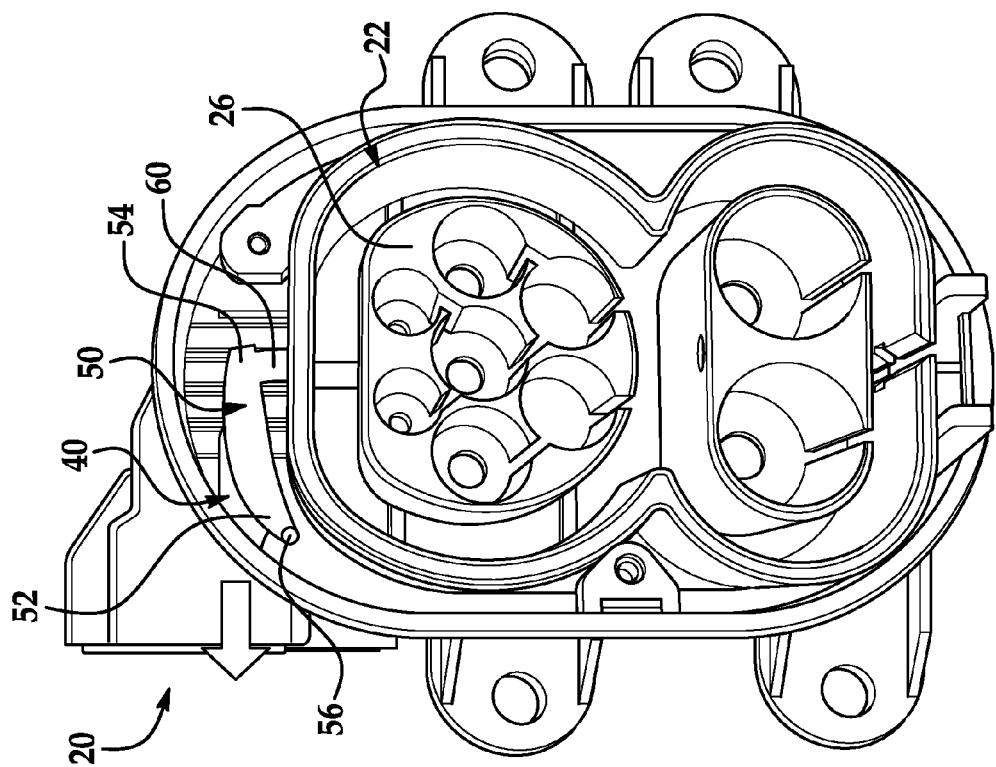
Figure 8B:
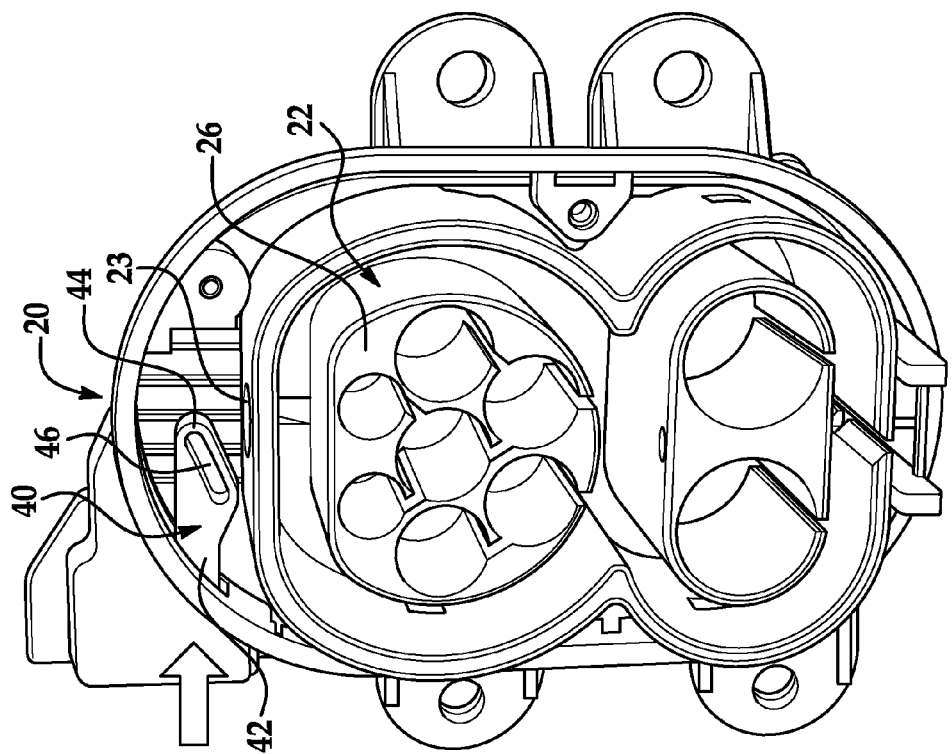
FIGS. 8A and 8B are front perspective views of a locking mechanism with a linear-actuated cam in an extended position according to an exemplary embodiment of the subject invention.
Figure 8A:
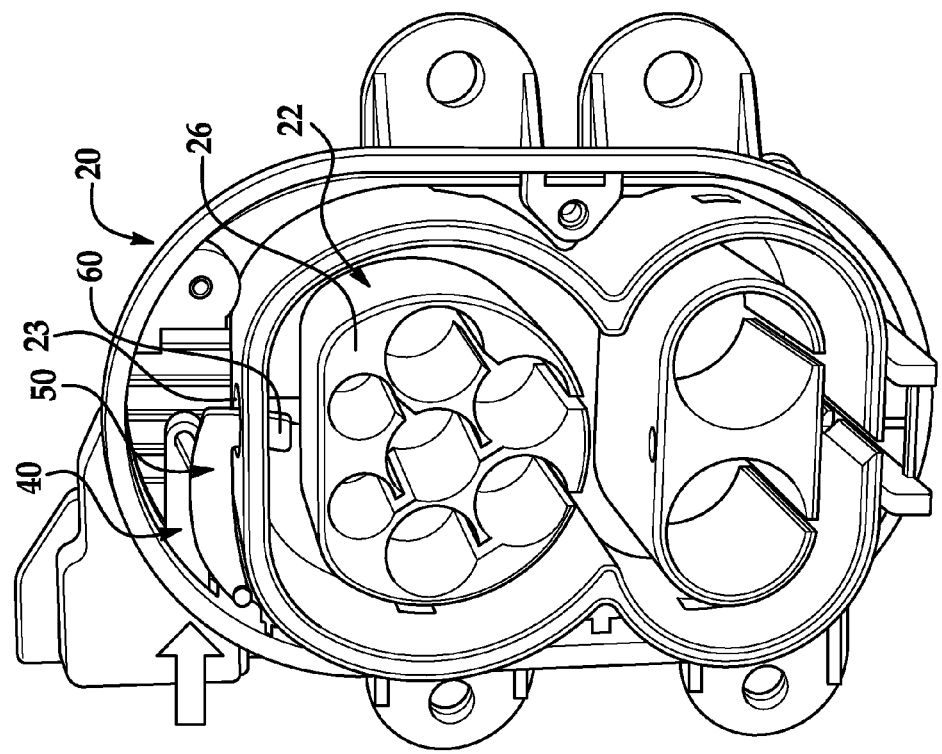
Figure 9A:
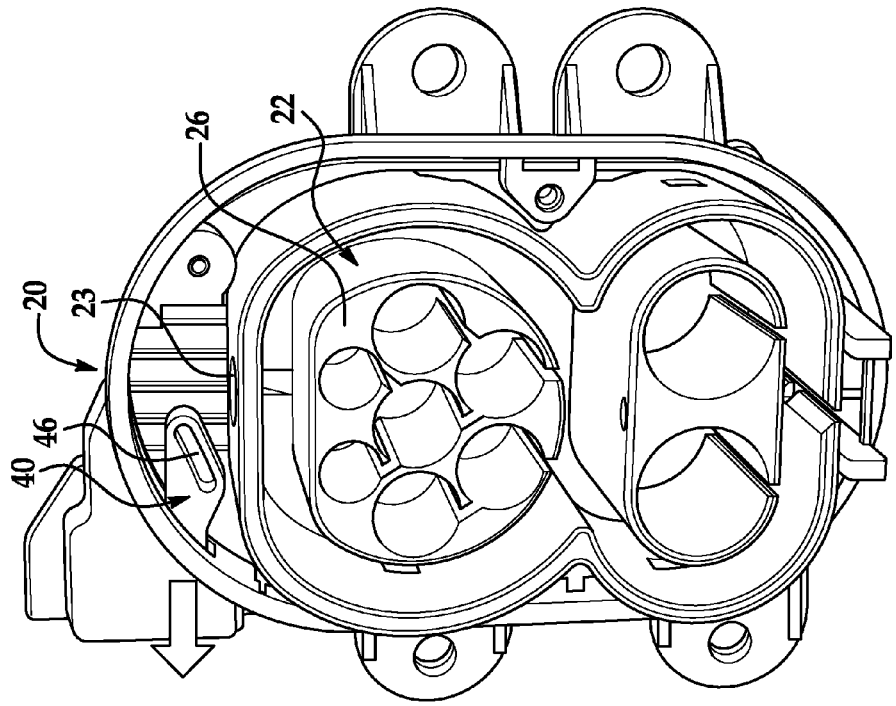
FIGS. 9A and 9B are front perspective views of a locking mechanism with a linear-actuated cam in a retracted position according to an exemplary embodiment of the subject invention.
Figure 9B:
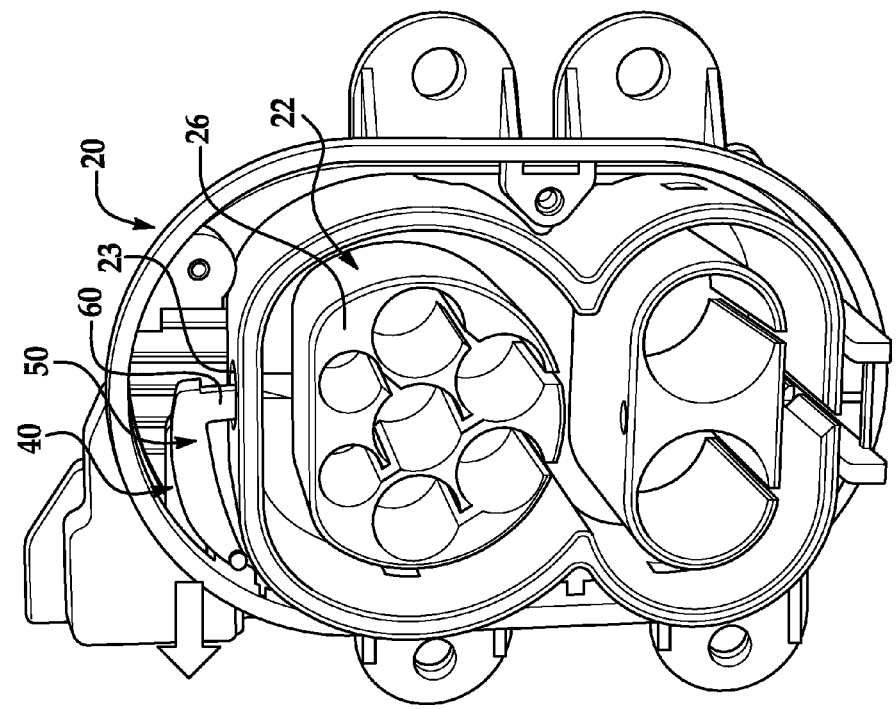

In operation, and with reference to FIGS. 6A-9B, the locking arm 50 is movable between an unlocked position (FIG. 7A) and a locked position (FIG. 7B). The linear-actuated cam 40 is movable between a refracted position and an extended position (FIGS. 6A and 6B). In an exemplary embodiment, the refracted position of the linear-actuated cam 40 corresponds to the unlocked position of the locking arm 50 (FIGS. 7A, 9A, and 9B), and the extended position corresponds to the locked position of the locking arm 50 (FIGS. 7B, 8A and 8B). However, it is understood that this configuration may be reversed.

With the locking arm 50 in the unlocked position and the linear-actuated cam 40 in the retracted position, the actuator 30 may be operated to move the locking arm 50 toward the locked position. In particular, the DC motor 31 of the actuator 30 operates to move the system of gears 32, which then moves the actuating pin 34 (FIG. 2). The actuating pin 34 is connected to the first end 42 (FIG. 4B) of the linear-actuated cam 40. Movement of the actuating pin 34 during a locking procedure causes the linear-actuated cam 40 to move along the linear travel path.

During movement of the linear-actuated cam 40 along the linear travel path, the cam slot 46 moves relative to the follower pin 58 of the locking arm 50. Sidewalls of the cam slot 46, which is angled relative to the linear travel path, apply a force to the follower pin 58 that causes the locking arm 50 to pivot about the pivot pin 56 toward the locked position. In addition, the cam slot 46 may provide a varied output by way of multiple segments 47, 48 extending at different angles relative to each other. Accordingly, an increased or decreased load may be outputted to the locking arm 50 at desired portions of the locking/unlocking process.

Figure 4A:
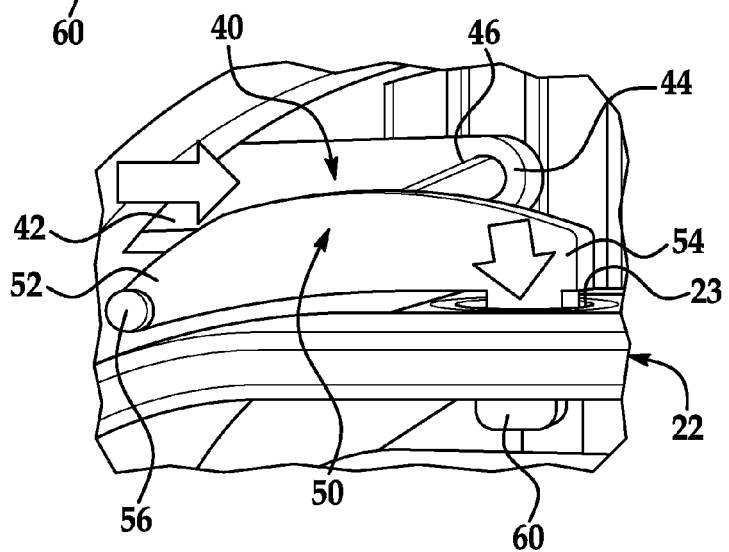
FIGS. 4A and 4B are front perspective views of a pivoting locking arm and linear-actuated cam, respectively, in locked positions according to an exemplary embodiment of the subject invention.
Figure 4B:
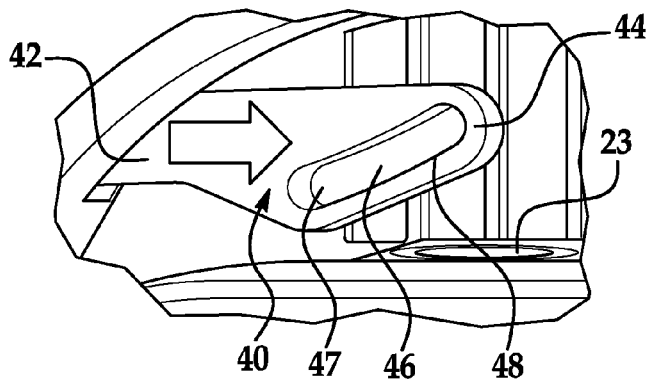
Figure 4C:
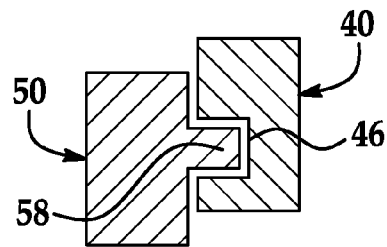
FIG. 4C is an isolated sectional view of a follower pin extending from a side of a pivoting locking arm and engaging a cam slot of a linear-actuated cam according to an exemplary embodiment of the subject invention.
Figure 5A:
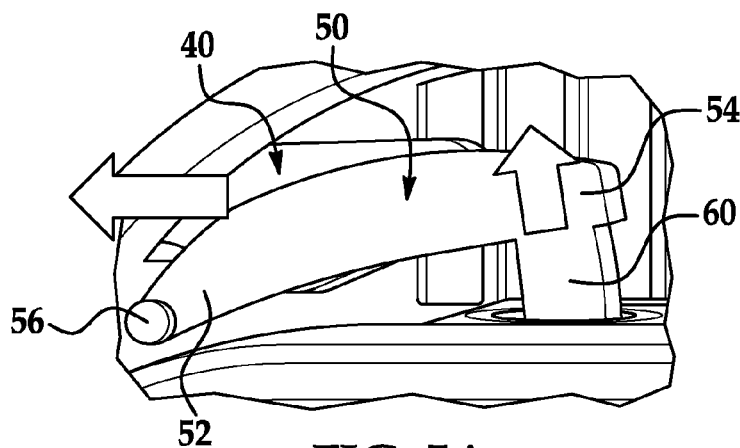
FIGS. 5A and 5B are front perspective views of a pivoting locking arm and linear-actuated cam, respectively, in unlocked positions according to an exemplary embodiment of the subject invention.
Figure 5B:
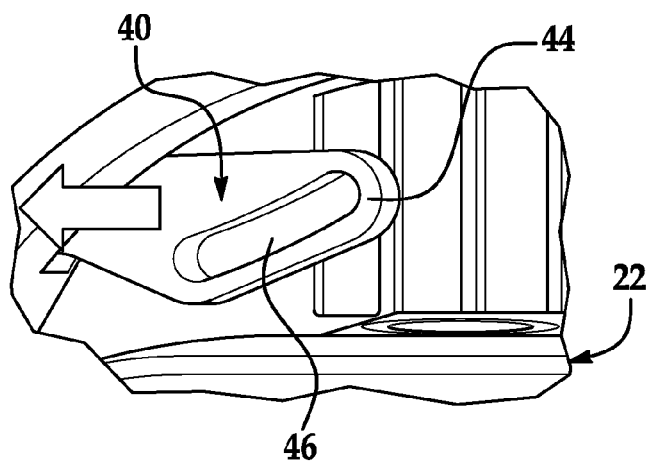

While pivoting toward the locked position, the lock bolt 60 moves with the remainder of the locking arm 50 and travels through an opening 23 in the receptacle 22 to be received in the receptacle 22 (FIG. 4A). The vehicle charging plug connected to the interface 26 in the receptacle 22 includes a corresponding opening (not shown) configured to receive the lock bolt 60. Accordingly, in the locked position, the lock bolt 60 may be received within the opening of the plug to secure the plug against removal from the receptacle 22.

The locking arm 50 is movable to the unlocked position by operating the actuator 30 in the opposite direction. In particular, the actuator 30 may be operated to move the actuating pin 34 in the opposite direction (i.e., in a "retracting" direction) so that the linear-actuated cam 40 is driven in the "retracting" direction along the linear travel path and moved toward the retracted position. Movement of the linear-actuated cam 40 toward the retracted position causes the cam slot 46 to move relative to the follower pin 58. The sidewalls of cam slot 46 act on the follower pin 58 to pivot the locking arm 50 away from the locked position. As detailed above, the output of the linear-actuated cam 40 may be varied by providing different angled segments 47, 48 in the cam slot 46. During movement away from the locking position, the lock bolt 60 is withdrawn from the receptacle 22 through the opening. In the unlocked position, the linear-actuated cam 40 is in the retracted position, and the locking arm 50 is pivoted to a position where the lock bolt 60 is withdrawn from the receptacle 22.

The exemplary embodiment above may enable increased actuator output in an efficient and compact manner for both locking and unlocking of the lock bolt 60 into and out of the plug in the receptacle 22. Friction may be reduced by allowing the locking arm 50 and lock bolt 60 to pivot (rather than translate linearly). In addition, output from the linear-actuated cam 40 may be varied to allow increased output at the beginning of a locking/unlocking stroke by varying the angle or shape of the cam slot 46.

Under SAE and IEC standards, there is limited space available in the housing to provide a locking mechanism. The exemplary embodiments above provide a locking mechanism that may be installed in the limited space and provide the desired locking function. Accordingly, the locking mechanism above may be packaged with the housing 20. Also, the locking mechanism described in the exemplary embodiments above may provide an efficient rotary engagement and disengagement of the locking bolt 60. The cam configuration between the linear-actuated cam 40 and the locking arm 50 may provide a high-output direct-cam drive in both locking and unlocking directions. Further, the locking mechanism may be tuned for a particular use by forming the cam slot 46 at different angles relative to the linear travel path and/or forming the cam slot 46 as a curved section. Accordingly, variable output to the locking bolt 60 may be provided to generate additional load as required.

Further still, the locking mechanism described in the exemplary embodiments above may be cost-effective. For example, the actuator 30 described above may be a known actuator presently used in other portions of the vehicle to control various functions. Thus, the production or purchase of a specialized actuator may not be required.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A locking mechanism for securing a plug of a charging cord in a charging receptacle of a vehicle, the receptacle configured to receive a charging cord from a first direction, the locking mechanism comprising:
    an actuator including an actuating pin movable along a linear travel path in a second direction the second direction being perpendicular to the first direction;
    a linear-actuated cam connected to and driven along the linear travel path by the actuating pin and defining a cam slot formed therein positioned at an angle relative to the linear travel path; and
    a locking arm pivotally mounted at a pivot point to a component disposed adjacent to the locking arm and including a follower pin that engages the cam slot and a lock bolt, the locking arm pivot having an axis extending parallel to the first direction, wherein the locking arm is configured to pivot about the pivot point to move between a locked position and an unlocked position in response to movement of the linear-actuated cam along the linear travel path and, during the pivoting, the lock bolt moves from a first position to a second position, the lock bolt being positioned in and at least partially through an opening in the receptacle to engage the charging cord.

2. The locking mechanism of claim 1, wherein the actuator includes a DC motor that is configured to move a system of gears to move the actuating pin along the linear travel path.

3. The locking mechanism of claim 1, wherein the linear-actuated cam includes a first end and a second end, the actuating pin is connected to the first end, and the cam slot is disposed on a face of the linear-actuated cam and extends at the angle relative to the linear travel path on the face.

4. The locking mechanism of claim 1, wherein the cam slot defines different segments extending at respective angles relative to the linear travel path different than each other to vary output of the linear-actuated cam.

5. The locking mechanism of claim 1, wherein the cam slot is linear or curved to vary output of the linear-actuated cam.

6. The locking mechanism of claim 1, wherein the locking arm includes a first end, a second end, and a pivot pin positioned along a length of the locking arm proximate to the first end of the locking arm, the lock bolt extending from proximate the second end of the locking arm.

7. The locking mechanism of claim 1, wherein the plug of the charging cord is connected to a charging interface in the receptacle and receives the lock bolt to secure the plug against removal from the receptacle in the locked position or allows withdrawal of the lock bolt to unsecure the plug in the unlocked position.

8. The locking mechanism of claim 1, wherein, during movement of the linear-actuated cam along the linear travel path, the cam slot moves relative to the follower pin.

9. The locking mechanism of claim 1, wherein the cam slot is angled relative to the linear travel path and sidewalls of the cam slot are configured to apply a force to the follower pin that causes the locking arm to pivot about the pivot pin toward the locked or unlocked position.

10. The locking mechanism of claim 1, wherein the cam slot is formed in the linear-actuated cam at an angle that provides a predetermined load in at least one of a locking and unlocking direction.

11. A housing of a vehicle including a system of batteries that receive a charge from an external power source, the housing comprising:
    a receptacle adapted to receive a charging cord from a first direction, the charging cord being coupled to the external power source;
    a charging interface configured to connect with the charging cord to allow current to flow from the external power source to the system of batteries during a charging operation; and
    a locking mechanism arranged in the housing to secure the charging cord in the receptacle, the locking mechanism including:
        an actuator including an actuating pin movable along a linear travel path in a second direction the second direction being perpendicular to the first direction;
        a linear-actuated cam connected to and driven along the linear travel path by the actuating pin and defining a cam slot formed therein positioned at an angle relative to the linear travel path; and
        a locking arm pivotally mounted at a pivot point to a component disposed adjacent to the locking arm and including a follower pin that engages the cam slot and a lock bolt, wherein the locking arm is configured to pivot about the pivot point to move between a locked position and an unlocked position in response to movement of the linear-actuated cam along the linear travel path and, during the pivoting, the lock bolt moves from a first position to a second position, the lock bolt being positioned in and at least partially through an opening in the receptacle to engage the charging cord.

12. The housing of claim 11, wherein the actuator includes a DC motor that is configured to move a system of gears to move the actuating pin along the linear travel path.

13. The housing of claim 11, wherein the linear-actuated cam includes a first end and a second end, the actuating pin is connected to the first end, and the cam slot is disposed on a face of the linear-actuated cam and extends at the angle relative to the linear travel path on the face.

14. The housing of claim 11, wherein the cam slot defines different segments extending at respective angles relative to the linear travel path different than each other to vary output of the linear-actuated cam.

15. The housing of claim 11, wherein the cam slot is linear or curved to vary output of the linear-actuated cam.

16. The housing of claim 11, wherein the locking arm includes a first end, a second end, and a pivot pin positioned along a length of the locking arm proximate to the first end of the locking arm, the lock bolt extending from proximate the second end of the locking arm.

17. The housing of claim 11, wherein the charging cord is connected to a charging interface in the receptacle and receives the lock bolt to secure the charging cord against removal from the receptacle in the locked position or allows withdrawal of the lock bolt to unsecure the charging cord in the unlocked position.

18. The housing of claim 11, wherein, during movement of the linear-actuated cam along the linear travel path, the cam slot moves relative to the follower pin.

19. The housing of claim 11, wherein the cam slot is angled relative to the linear travel path and sidewalls of the cam slot are configured to apply a force to the follower pin that causes the locking arm to pivot about the pivot pin toward the locked or unlocked position.

20. The housing of claim 11, wherein the cam slot is formed in the linear-actuated cam at an angle that provides a predetermined load in at least one of a locking and unlocking direction.

* * * * *